United States Patent [19]

Yamaoka et al.

[11] Patent Number: 5,277,283
[45] Date of Patent: Jan. 11, 1994

[54] VARIABLE DAMPING-CHARACTERISTICS SHOCK ABSORBER WITH ADJUSTABLE ORIFICE CONSTRUCTION VARIABLE OF FLUID FLOW RESTRICTION DEPENDING UPON FLUID PRESSURE DIFFERENCE

[75] Inventors: Fumiyuki Yamaoka; Issei Kanari, both of Kanagawa, Japan

[73] Assignee: Atsugi Unisia Corporation, Japan

[21] Appl. No.: 44,086

[22] Filed: Apr. 6, 1993

Related U.S. Application Data

[63] Continuation of Ser. No. 763,496, Sep. 23, 1991, abandoned, which is a continuation of Ser. No. 408,261, Sep. 18, 1989, abandoned.

[30] Foreign Application Priority Data

Sep. 19, 1988 [JP] Japan ................. 63-234610
Sep. 19, 1988 [JP] Japan ................. 63-234611

[51] Int. Cl.$^5$ .................. F16D 9/00; B60G 13/00
[52] U.S. Cl. .................. 188/319; 188/282; 188/322.15; 188/299
[58] Field of Search ............. 188/322.15, 319, 282, 188/299, 317; 280/714; 137/512.15, 512.4

[56] References Cited

U.S. PATENT DOCUMENTS

| | | | |
|---|---|---|---|
| 2,546,051 | 3/1951 | Whisler, Jr. ............. | 188/317 X |
| 4,203,507 | 5/1980 | Tomita et al. ............ | 188/282 X |
| 4,352,417 | 10/1982 | Stinson ................ | 188/322.15 |
| 4,561,524 | 12/1985 | Mizumukai et al. . | |
| 4,721,130 | 1/1988 | Hayashi ............... | 137/512.15 |
| 4,724,937 | 2/1988 | Fannin et al. .......... | 137/512.15 X |
| 4,826,207 | 5/1989 | Yoshioka et al. ...... | 280/714 |
| 4,905,799 | 3/1990 | Yamaoka et al. ...... | 188/282 X |

FOREIGN PATENT DOCUMENTS

| | | |
|---|---|---|
| 22253 | 8/1978 | Australia . |
| 39662 | 9/1985 | Australia . |
| 56846 | 10/1986 | Australia . |
| 0174119 | 3/1986 | European Pat. Off. . |
| 0196030 | 10/1986 | European Pat. Off. . |
| 207409 | 1/1987 | European Pat. Off. ........ 188/322.15 |
| 951693 | 10/1956 | Fed. Rep. of Germany .......... 137/512.15 |
| 1287455 | 1/1969 | Fed. Rep. of Germany . |
| 3425988 | 1/1986 | Fed. Rep. of Germany . |
| 3532293 | 3/1987 | Fed. Rep. of Germany . |
| 61-164836 | 10/1986 | Japan . |
| 278333 | 12/1987 | Japan ................... 188/319 |
| 63-23460 | 9/1988 | Japan . |
| 63-23461 | 9/1988 | Japan . |
| 1009252 | 11/1965 | United Kingdom . |
| 1539652 | 1/1979 | United Kingdom . |
| 2111168 | 6/1983 | United Kingdom . |
| 2159917 | 12/1985 | United Kingdom . |

Primary Examiner—Mark T. Le
Attorney, Agent, or Firm—Ronald P. Kananen

[57] ABSTRACT

A shock absorber is provided a piston stroke speed dependent linear variation characteristics of damping force. The shock absorber includes variable orifices in tandem fashion for achieving linear variation characteristics of damping force according to variation of the piston stroke. One of the variable orifices is provided with variation characteristics of flow restriction for a greater variation rate of the damping force in a low piston stroke speed range, and the other is provided variation characteristics of flow restriction for a greater variation rate of the damping force in the intermediate and high piston stroke speed range. The variable orifice may be provided in a piston assembly or in the alternative in a bottom fitting in the case of a double-action type shock absorber.

2 Claims, 8 Drawing Sheets

VARIABLE DAMPING-CHARACTERISTICS SHOCK ABSORBER WITH ADJUSTABLE ORIFICE CONSTRUCTION VARIABLE OF FLUID FLOW RESTRICTION DEPENDING UPON FLUID PRESSURE DIFFERENCE

This application is a continuation of application Ser. No. 07/763,496 filed Sep. 23, 1991, now abandoned, which is a cont. of application Ser. No. 07/408,261, filed Sep. 18, 1989, abandoned.

BACKGROUND OF THE INVENTION

1. Field of the Invention

The present invention relates to a generally to a variable damping characteristics shock absorber, suitable for use in an automotive suspension system.

2. Description of the Background Art

Japanese Utility Model First (unexamined) Publication No. 61-164836 discloses a variable damping characteristics shock absorber of the type for which the present invention is directed. In the disclosed construction, an orifice is formed through a piston for generating a damping force in response to a piston stroke according to relative displacement of a vehicular body and a suspension member which rotatably supports a road wheel. An end of the flow restriction orifice is closed by a disc valve which opens and closes the end of the orifice. A fluid passage is formed through a piston rod in a parallel relationship with the flow restriction orifice. A flow control means is associated with the fluid passage for adjusting a fluid flow path in the fluid passage for adjusting damping characteristics.

In the shown construction, higher or harder suspension characteristics or a greater damping force may be generated by greater magnitude of flow restriction provided by the flow control means. By a greater magnitude flow restriction, a smaller amount of working fluid flows through the fluid passage for generating a greater fluid pressure difference at both sides of the piston and thus generating a greater damping force. On the other hand, lower or softer damping characteristics are obtained by a smaller magnitude of flow restriction for allowing a greater amount of working fluid to flow through the fluid passage. A greater amount of fluid flow through the fluid passage may reduce a fluid pressure difference at both sides of the piston for generating a smaller magnitude of the damping force.

In such construction of shock absorbers, it has been observed that, at a relatively low piston stroke speed range, the flow control means of the fluid passage is principally effective for generating a damping force. On the other hand, at a relatively high piston stroke range, the orifice is principally effective for generating a damping force. Since the orifice and flow control means have different variation characteristics of magnitude of fluid flow restriction, a smooth variation of damping characteristics is not available through relatively wide piston stroke speed range.

Furthermore, neither of the orifice nor flow control means may provide linear characteristics in varying the damping characteristics, the prior proposed shock absorber is still not satisfactory in view of an achievement of both vehicular driving stability and riding comfort at any vehicular driving condition.

SUMMARY OF THE INVENTION

Therefore, it is an object of the present invention to provide a variable damping characteristics shock absorber which varies damping characteristics or damping force in essentially or close to linear characteristics.

In order to accomplish aforementioned and other objects, a shock absorber, according to the present invention, is provided with a piston stroke speed dependent on linear variation characteristics of damping force. The shock absorber includes variable orifices in tandem fashion for achieving linear variation characteristics of a damping force according to variation of the piston stroke. One of the variable orifices is provided with a variation of characteristics of flow restriction for a greater variation rate of the damping force in a low piston stroke speed range, and the other is provided with a variation characteristics of flow restriction for a greater variation rate of the damping force in the intermediate and high piston stroke speed ranges. The variable orifice may be provided in a piston assembly or in the alternative in a bottom fitting in case of a double-action type shock absorber.

According to one aspect of the invention, a variable damping force shock absorber for damping relative displacement between first and second movable members, having variable damping characteristics according to piston stroke speed comprises:

a hollow cylinder defining therein first and second fluid chambers;

a first damping force generating means responsive to piston stroke for generating a first damping force variable according to first variation characteristics in relation to variation of the piston stroke speed;

a second damping force generating means responsive to the piston stroke for generating a second damping force variation according to second variation characteristics in relation to variation of the piston stroke speed; and the first and second damping force generating means being cooperative with each other in one direction of piston stroke for generating an active damping force for damping relative movement of the first and second movable members; and the first and second variation characteristics being set for compensating each other for providing substantially linear variation characteristics of the active damping force in accordance with variation of piston stroke speed.

In the practical construction, the first damping force generating means may comprise:

a primary path defined in a valve body separating the first and second fluid chambers, for fluid communication between the first and second fluid chambers;

a first window opening defined on the valve body and communicated with the primary path, the first window opening being surrounded by a first land having a first surface; and a first resilient valve means resiliently biased toward the surface for normally establishing sealing contact with the first surface and responsive to fluid flow in a first flow direction generated by the piston stroke in the one stroke direction for forming a first flow restrictive path for fluid communication from the first window opening and one of the first and second fluid chambers for generating the first damping force.

Also, the second damping force generating means may comprise:

a subsidiary path permitting fluid communication between the first and second fluid chambers;

a second window opening formed on the valve body in fluid communication with the subsidiary path, the second window opening being defined by a second land with a second surface, and a second resilient valve means resiliently biased toward the second surface for normally establishing sealing contact with the second surface and responsive to fluid flow in a first flow direction generated by the piston stroke in the one stroke direction for forming a second flow restrictive path for fluid communication between the first and second window openings for generating the second damping force.

The first and second damping force generating means may be oriented in tandem fashion with respect to the fluid flow so that the first and second damping force generating means are cooperative for generating the active damping force. Practically, the first damping force generating means is provided with variation characteristics for providing a greater damping force variation rate at a low piston speed range, and the second damping force generating means is provided with variation characteristics for providing a greater damping force variation rate at an intermediate and high piston stroke speed range.

In the preferred construction, the shock absorber may further comprise a third damping force generating means which is externally actuated for varying a flow restriction magnitude for adjusting damping characteristics.

The first and second damping force generating means may be provided in a piston assembly.

Preferably, the shock absorber comprises a double action-type shock absorber having inner and outer cylinders, and the first and second damping force generating means are provided in a bottom fitting separating and interposed between the first and second fluid chambers.

The first and second surfaces are oriented on the same plane and the first and second resilient valve means may comprise a common valve member mating with both of the first and second surfaces. In such case, the shock absorber may further comprise an auxiliary resilient member exerting a resilient force for the common valve member at the orientation corresponding to the second surface for resiliently restricting deformation magnitude, so that the first damping force generating means is provided with variation characteristics for providing a greater damping force variation rate at a low piston speed range, and the second damping force generating means is provided with variation characteristics for providing a greater damping force variation rate at an intermediate and a high piston stroke speed range.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
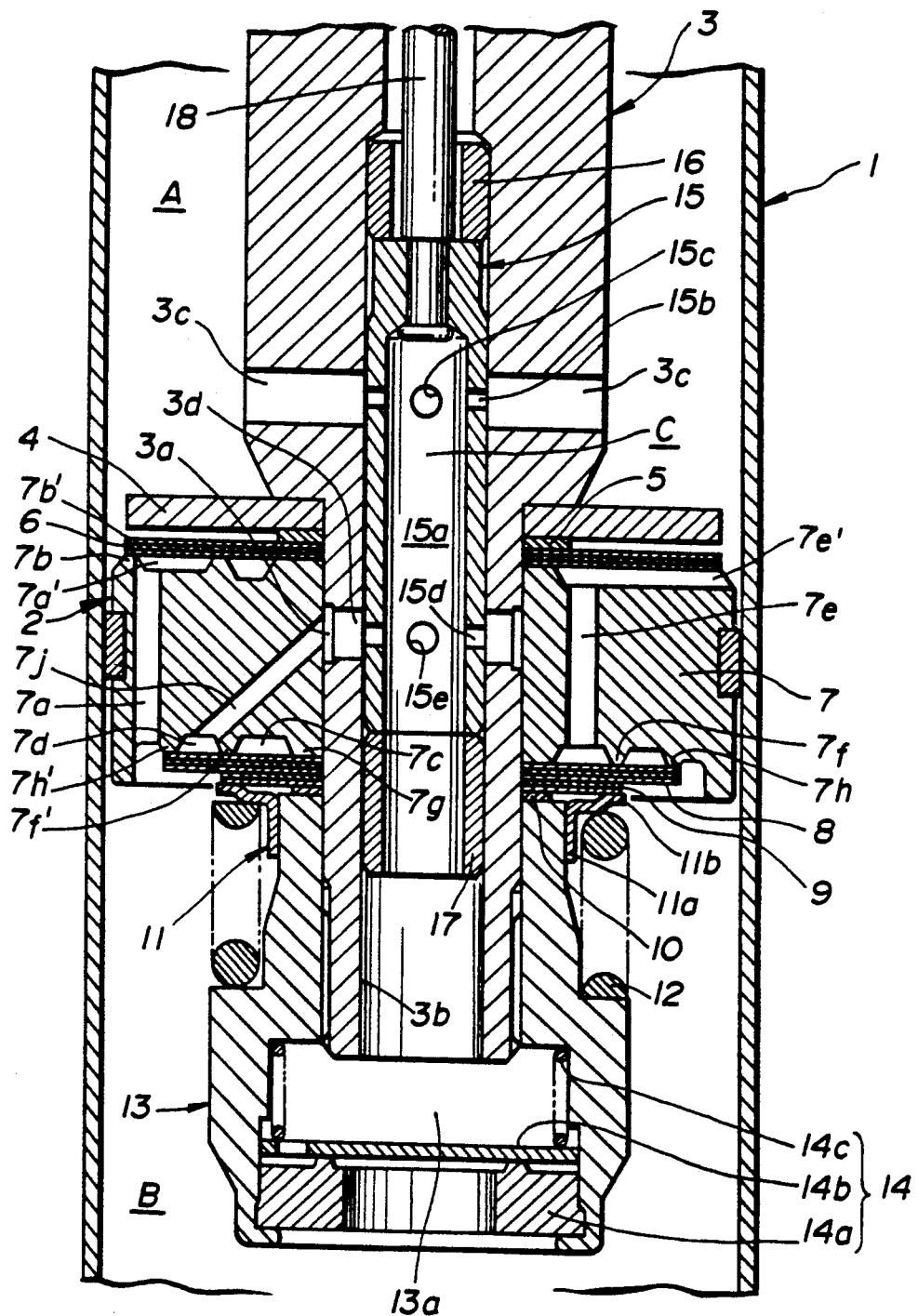
FIG. 1 is a sectional view of the major part of the first embodiment of a variable damping characteristics shock absorber according to the present invention.
Figure 2:
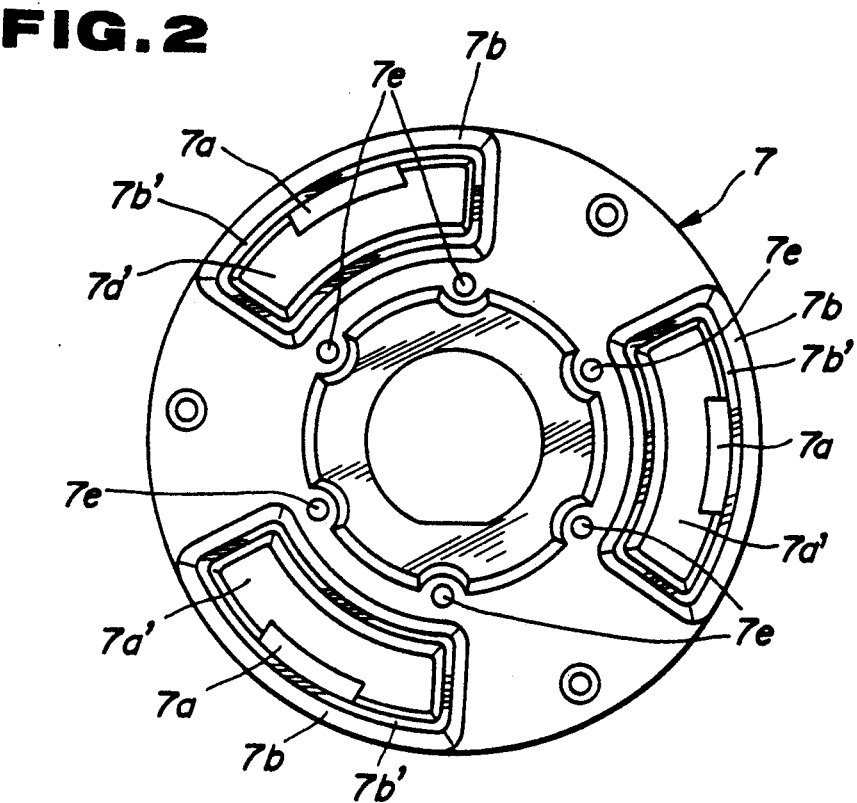
FIG. 2 is a plan view of a piston employed in the first embodiment of the shock absorber of FIG. 1.
Figure 3:
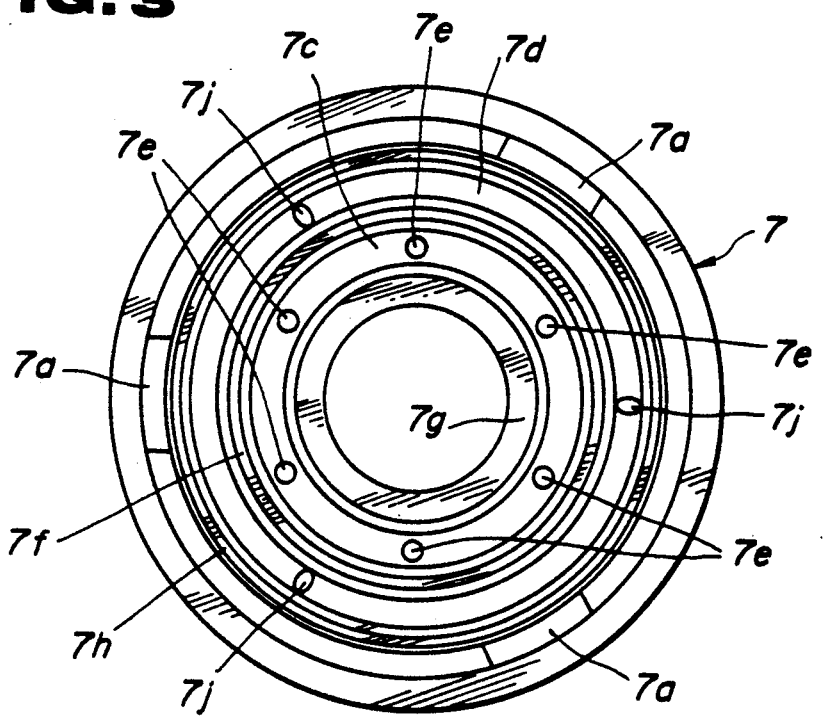
FIG. 3 is a bottom view of the piston employed in the first embodiment of the shock absorber of FIG. 1.

Referring now to the drawings, particularly to FIGS. 1 through 3, the first embodiment of a shock absorber is formed as a double-action type shock absorber including an inner and an outer cylinder coaxially arranged with each other. In FIG. 1, only the inner cylinder 1 is disclosed. The double-action type shock absorber per se is generally well known in the art and thus this specification does not need to specifically disclose all construction thereof. Therefore, in the drawings, the outer cylinder is neglected for simplification of illustration on the drawings and associated disclosure.

A piston assembly 2 is slidingly or thrustingly disposed within the interior space of the inner cylinder 1 to define upper and lower fluid chambers A and B which are filled with a working fluid. The piston 2 is fixed to the lower end of a piston rod 3 with a retainer 4, a washer 5, an upper disc valve 6, a piston body 7, a first lower disk valve 8, a second lower disc valve 9, a washer 10, a spring seat member 11 and a spring 12. The components set forth above form a piston assembly and are retained at the lower end portion of the piston rod 3 by means of a fastening nut 13.

The piston body 7 is formed with an axially extending fluid passages 7a and 7e. As can be seen from FIG. 1, the fluid passage 7a is oriented at a position closer to the outer periphery of the piston body than that of the fluid passage 7e. Therefore, in the following discussion, the fluid passage 7a will be referred to as an "outer axial passage" and the fluid passage 7e will be referred to as an "inner axial passage". As seen from FIGS. 2 and 3, in the shown embodiment, three outer axial passages 7a are formed with circumferential intervals. Each of the outer axial passages 7a is formed into an essentially arc-shaped configuration having a predetermined circumferential width, and has an upper end opening to a groove 7a' defined by continuous land 7b having a valve seat surface 7b'. The upper disc valve 6 has circumferential edge portions seating on the seat surface 7b' of the land 7b. As can be seen from FIG. 1, the upper disc valve 6 at a position completely closing the groove 7a' seats on the entire seat surface 7b'. On the other hand, the lower end of the outer axial passage 7a is directly exposed to the lower fluid chamber B, so that the working fluid in the lower fluid chamber is free to flow therewithin.

On the other hand, the inner axial passages 7e respectively have circular cross sections. In the shown embodiment, six inner axial passages 7e are circumferentially arranged with equal intervals, as shown in FIGS. 2 and 3. The upper end of each of inner axial passages 7e is directly exposed to the upper fluid chamber A via a clearance 7e' defined between the upper face of the piston body 7 and the upper disc valve 6. The lower end of the inner axial passage 7e is open to an inner annular groove 7c which is defined between a central boss section 7g and an annular land 7f. The annular land 7f further defines an outer annular groove 7d with an annular land 7h as particularly shown in FIGS. 1 and 3. The annular lands 7f and 7h respectively define valve seat surfaces 7f' and 7h' for seating thereon the first lower disc valve 8. Similarly to the upper disc valve 6, the first lower valve 8 normally seats on the seat surfaces 7f' and 7h' for sealing the inner and outer grooves 7c and 7d and is subject to the fluid pressure in the upper fluid chamber A introduced into the inner axial passages 7e via the clearance 7e'.

The piston rod 3 is formed with an axially extending center opening 3b. The center opening 3b is communicated with the upper fluid chamber A via radially extending openings 3c. The radially extending openings 3c will be hereafter referred to as "upper ports". On the other hand, the center opening 3b is in fluid communication with the outer annular groove via radially extending opening 3d, an annular groove 3a and obliquely extending openings 7j which extends in oblique with respect to the axis of the piston rod 3. The radially extending openings will be hereafter referred to as "lower ports".

A rotary valve member 15 is rotatably disposed within the axially extending opening 3b for rotation thereabout. The rotary valve member 15 is supported or maintained by upper and lower thrust bushings 16 and 17. The rotary valve member 15 is fixed to the lower end of an actuator rod 18. The actuator rod 18 is connected to a rotary actuator (not shown) for rotatingly driving the actuator rod 18 and thus drives the rotary valve member 15. The rotary actuator has been disclosed in U.S. Pat. No. 4,776,437, issued on Oct. 11, 1988 and assigned to the common assignee to the present invention, for example. The disclosure of U.S. Pat. No. 4,776,437 is herein incorporated by reference for the sake of disclosure. The rotary valve member 15 defines a lower end opened bore communicated with the center opening 3b of the piston rod 3. The rotary valve members have a plurality of radially extending openings at an axial position corresponding to the position of the upper ports 3c. The radially extending openings of the rotary valve member 15 have different diameters than adjacent ones so as to provide different fluid flow path areas at different angular positions. In the shown embodiment, the rotary valve member 15 is formed with smaller diameter openings 15b and a greater diameter openings 15c with 90° of angular intervals. Therefore, according to angular position of the rotary valve member 15, one of the openings 15b and 15c is selectively aligned with the upper ports 3c for providing a different path area for fluid communication between the interior space of the rotary valve member 15 and the upper fluid chamber A. As can be seen from FIG. 1, the interior space of the rotary valve member 15 is in fluid communication with the center opening 3b of the piston rod 3 for defining a chamber C extending in the axial direction. Therefore, the chamber defined by the interior space of the rotary valve member 15 and the center opening 3b will be hereafter referred to as an "axial chamber". The rotary valve member 15 is also formed with a plurality of radially extending openings at an axial position corresponding to the lower ports 3d. Similarly to the foregoing openings 15b and 15c, the shown embodiment is formed with openings 15d and 15e having different diameters. As can be seen from FIG. 1, the opening 15d is adapted to be aligned with the lower ports 3d at the angular position of the rotary valve member 15 where the openings 15b are aligned with the upper ports 3c, and have a smaller diameter than that of the opening 15e.

The nut 13 is engaged with the threaded lower end of the piston rod. The nut defines a lower end opened bore 13a through which the interior space of the central opening 3b of the piston rod 3 communicates with the lower fluid chamber B. A check valve assembly 14 including an annular valve seat 14a fixed to the lower end of the nut 13, a valve disc 14b and a bias spring 14c, is disposed within the bore 13a. The valve disc 14b is normally biased toward the valve seat 14a by means of the bias spring 14c in order to permit fluid flow directed from the lower fluid chamber B to the upper fluid chamber A via the center opening 3b and to block fluid flow in the opposite direction. The spring seat 11 is associated with the nut 13 for movement therealong. The spring seat 11 has a cylindrical section 11a and an outwardly and essentially horizontal flange-like section 11b on which one end of the spring 12 is seated. The other end of the spring 12 is seated on the stepped section of the nut. Therefore, the spring seat 11 is normally biased upwardly.

The second lower disc valve 9 has its external diameter substantially corresponding to the outer diameter of the annular form seat surface 7f' and the flange-like section 11b of the spring seat 11. Therefore, the spring seat 11 is associated with the second lower disc valve 9 for exerting a biasing force of the spring 12 to the latter and thus exerting the spring load onto the first disc valve 8.

Figure 4:
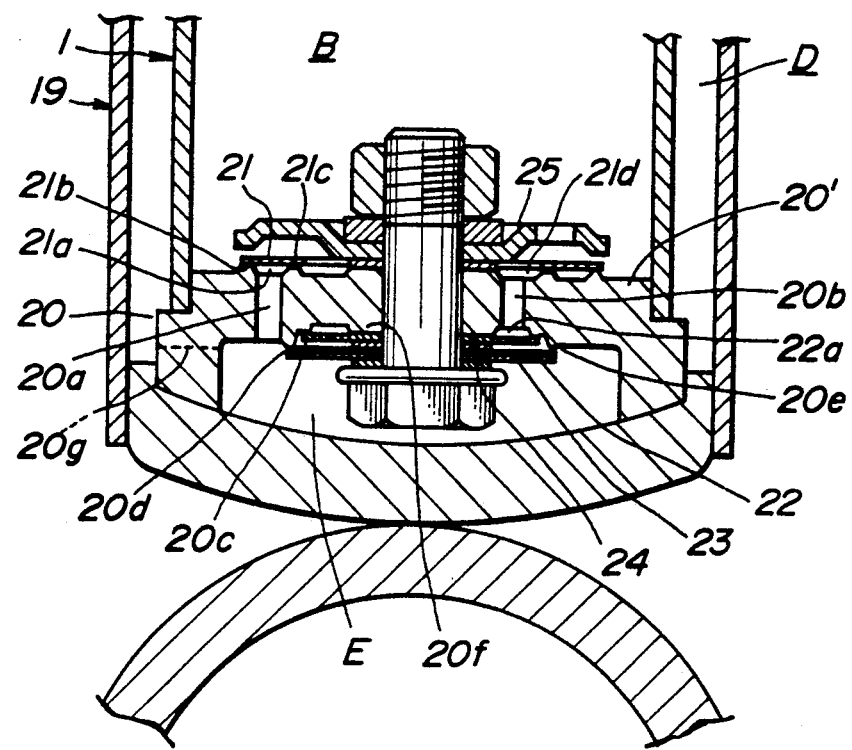
FIG. 4 is a sectional view showing construction of a bottom valve employed in the first embodiment of the shock absorber of FIG. 1.

As shown in FIG. 4, a bottom valve assembly 20 is fitted to the lower end of the inner cylinder 1 for controlling fluid communication between the lower fluid chamber B and an annular reservoir chamber D defined between the inner cylinder 1 and an outer cylinder 19. The bottom valve assembly 20 includes a bottom fitting 20' rigidly fitted to the lower end of the inner cylinder 1. The bottom fitting 20' defines axial openings 20a and 20b for fluid communication between the lower fluid chamber B and a chamber E defined between the bottom fitting 20' and a bottom closure 25. The upper end of the axial opening 20a opens to an outer annular groove 21a defined between lands 21b and 21c, which outer annular groove is closed by an upper disc valve 21. Adjacent the upper disc valve 21 is provided a stopper washer 24 which restricts magnitude of deformation of the disc valve for defining maximum path area to be formed between the land 21c and the outer circumferential edge portion of the upper disc valve 21. The lower end of the axial opening 20a is exposed to the chamber E. On the other hand, the upper end of the axial opening 20b opens to an inter annular groove 21d which is in direct fluid communication with the lower fluid chamber B via a through opening 21e formed through the disc valve 21. The lower end of the axial opening 20b opens to an annular groove 22a defined between land 20c and a center bore 20f. A first lower disc valve 22 seats on the land 20c for normally closing the annular groove 22a. A second lower disc valve 23 seating on an annular land 20d is placed in a spaced apart relationship with the first lower disc valve 22 via a spacer washer 23b. The land 20d is formed with a radially-extending groove 20e serving as flow restricting orifice.

The chamber E defined in the bottom fitting 20' is communicated with the reservoir chamber D via an radial path 20g defined through the circumferentially extending cylindrical portion of the bottom fitting.

The operation of the aforementioned first embodiment of the shock absorber will be discussed herebelow with respect to bounding and rebounding mode operations.

During a piston rebounding stroke to cause compression of the volume of the upper fluid chamber A, the pressure of the working fluid in the upper fluid chamber is naturally increased to be higher than that in the lower fluid chamber B. As a result, the working fluid flow from the upper fluid chamber A to the lower fluid chamber B is generated. Part of the working fluid then flows into the inner axial passage 7e via the clearance 7e'. Then, the working fluid having a pressure higher than that in the lower fluid chamber B becomes active on the portion of the first lower disc valve 8 opposing to the inner annular groove 7c to cause deformation of the first and second disc valves 8 and 9 and fluid flow into the outer annular chamber 7d and subsequently into the lower fluid chamber B through an annular clearance defined between the circumferential edge portion of the first disc valve 8 and the seat surface 7h' of the land 7h.

On the other hand, the other part of the working fluid flows into the axial chamber C via the upper ports 3c and the openings 15c or 15d which are aligned with the upper ports. At this time, since the fluid pressure in the axial chamber C is held higher than that in the lower fluid chamber B, the valve disc 14b is tightly seated on the valve seat 14a for blocking fluid flow therethrough. Therefore, the fluid flows into the outer annular groove 7d via the opening 15d or 15e, the lower ports 3d, the annular groove 3a and the oblique passage 7j and subsequently flows into the lower fluid chamber B defined between the circumferential portion of the first disc valve 8 and the seat surface 7h' of the land 7h.

At this time, since the magnitude of deformation of the first lower disc valve 8 with respect to the seat surface 7f is restricted by the resilient force of the second lower disc valve 9 as loaded the spring force of the spring 12, the deformation magnitude of the first lower disc valve 8 at the portion corresponding to the seat surface 7f is limited to provide greater flow restriction. Such flow restriction may be substantial while the pressure difference between the upper and lower fluid chambers A and B is relatively small. Since the pressure difference between the upper and lower fluid chambers is essentially proportional to the piston stroke, the In the shown construction, the orifices are defined between the first disc valve 8 and the seat surface 7f of the land 7f and between the first disc valve 8 and the seat surface 7h' of the land 7h in tandem fashion. At a relatively low piston speed range, these orifices are principally effective for generating a damping force for a relatively low pressure difference between the upper and lower fluid chambers A and B and thus for a small magnitude of deformation of the first disc valve 8. On the other hand, at an intermediate and higher piston speed range, a greater pressure difference between the upper and lower fluid chambers A and B is generated for causing a greater deformation magnitude of the first disc valve 8 therefore, the throttling effect of the orifices becomes smaller. Therefore, at this speed range, the orifice effect of the openings 15b or 15c and 15d or 15e is principally active for generating a damping force.

Figure 5:
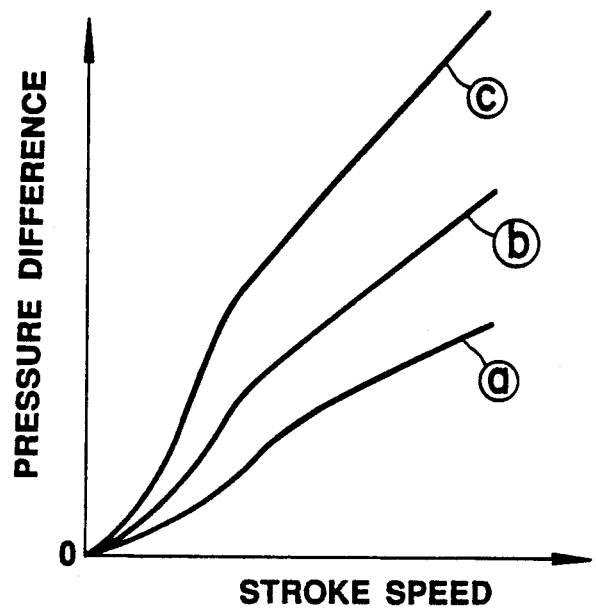
FIG. 5 is a graph showing relationship between a pressure difference of inner and outer grooves and a piston stroke speed, during piston rebounding stroke.

FIG. 5 shows pressure difference between the inner and outer grooves 7c and 7d in relation to piston stroke magnitude. It should be appreciated, in the characteristics shown in FIGS. 5 through 8, that the line a shows characteristics obtained at the angular position of the rotary valve member 15 where the openings 15c and 15e are aligned with the upper and lower ports 3c and 3d, the line b shows characteristics obtained at the angular position of the rotary valve member 15 where the openings 15b and 15d are aligned with the upper and lower ports, and the line c shows characteristics obtained at the angular position of the rotary valve member where the upper and the lower ports are fully blocked. As will be appreciated, this pressure difference exhibits an orifice effect at the orifice defined between the first lower disc valve 8 and the seat surface 7f of the land 7f. Therefore, because of a substantial restriction of deformation by the spring force exerted through the second lower disc valve, a variation rate of the pressure difference is held small in the low piston stroke range. On the other hand, a variation rate of the pressure difference becomes greater according to an increase in piston stroke speed. In addition, as can be observed from FIG. 5, the variation characteristics of the pressure difference obtained at the orifice between the inner and outer grooves 7c and 7d are close to linear characteristics. This tendency is increased as the piston stroke speed increases.

Figure 6:
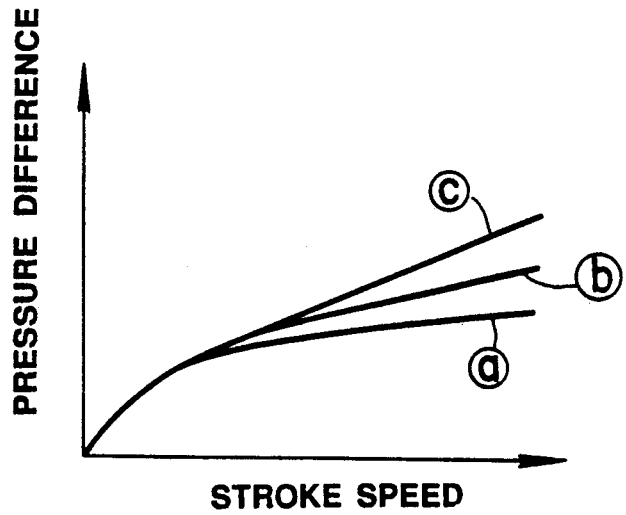
FIG. 6 is a graph showing relationship between a pressure difference of the outer groove and a lower fluid chamber and the piston stroke speed.
Figure 7:
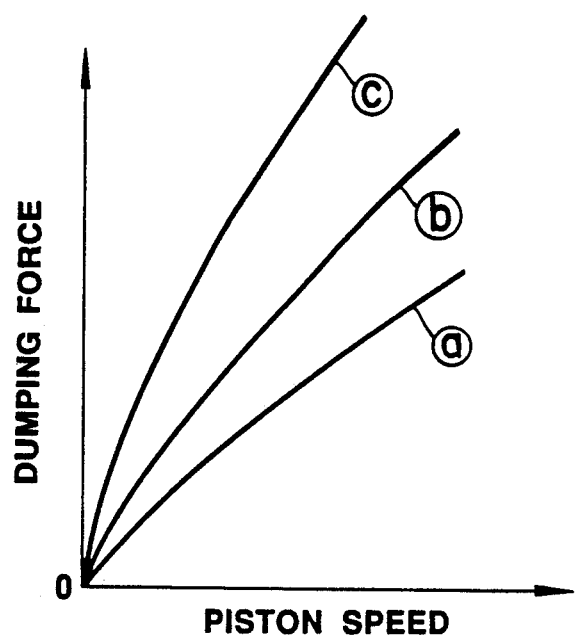
FIG. 7 is a graph showing relationship between a damping force generating in the piston rebounding stroke and the piston stroke speed.

FIG. 6 shows a variation of pressure difference between the outer groove 7d and the lower fluid chamber B. As can be seen from FIG. 6, at any of the angular positions of the rotary valve member 15, a greater variation rate of the pressure difference is caused at a low piston stroke speed range. The variation rate of the pressure difference is reduced according to an increase in the piston stroke speed. Furthermore, the characteristics of the variation of the variation rate of the pressure difference at the intermediate and high piston stroke speed range is substantially linear.

Since orifices defined between the first lower disc valve 8 and the seat surface 7f and between the first lower disc valve 8 and the seat surface 7h' are arranged in tandem fashion, the damping characteristics to be generated becomes a combination of the characteristics of FIGS. 5 and 6. Therefore, substantially linear damping characteristics in relation to the piston stroke speed can be obtained at any piston stroke speed range.

In the piston bounding stroke, the volume of the lower fluid chamber B is compressed to cause higher fluid pressure. Therefore, fluid flow from the lower fluid chamber B to the upper fluid chamber A is generated.

Part of the working fluid flows into the outer axial passage 7a for exerting fluid pressure to the corresponding portion of the upper disc valve 6 to cause deformation of the latter. By deformation, an annular orifice is formed between the upper disc valve 6 and the seat surface 7b' of the land 7b for permitting fluid flow therethrough. The other part of the working fluid flows into the axial chamber C by shifting the valve disc 14b away from the valve seat 14a. Then, the working fluid in the axial chamber C flows through the openings 15b or 15c and the upper port 3c into the upper fluid chamber A.

At the same time, the increased fluid pressure in the lower fluid chamber B acts on the first lower disc valve 22 for causing deformation to open an annular orifice between the mating surface of the disc valve and the seat surface 20c. Therefore, the working fluid pressure acts on the second lower disc valve 23. While the piston stroke speed is relatively low, the pressure difference between both sides of the second lower disc valve 23 is held small so as not to cause deformation of the disc valve. As a result, the second lower disc valve stays on the seat surface of the land 20d. Therefore, fluid flow is then permitted only through the radially extending groove 20e. Since the radially extending groove provides the flow restriction, a damping force is generated. On the other hand, at the intermediate and high piston stroke speed range, the pressure difference between both sides of the second lower disc valve 23 becomes substantial to cause deformation of the disc valve for forming an annular orifice to permit fluid flow into the chamber E.

Figure 8:
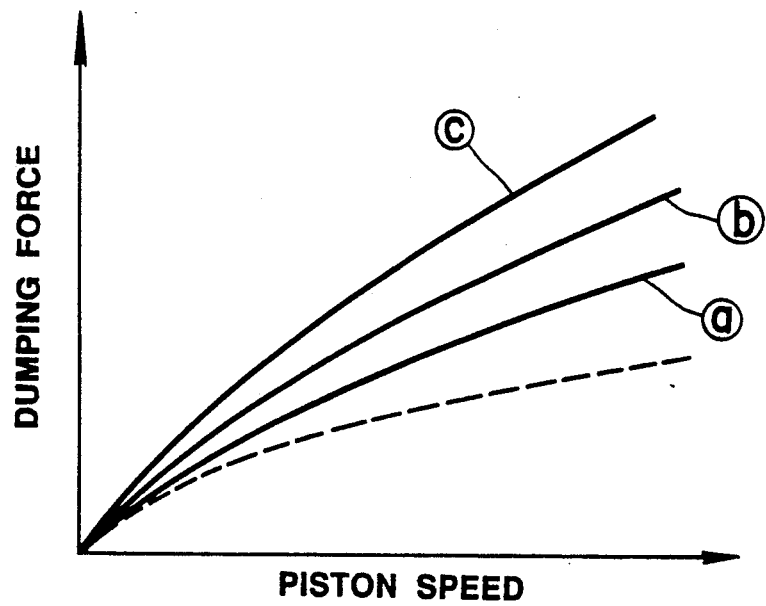
FIG. 8 is a graph showing relationship between a damping force generating in the piston bounding stroke and the piston stroke speed.

By a combination of the orifice effect in the annular orifice formed between the upper disc valve 7b' of the land 7b, the orifice effect in the radially extending groove 20e, and the orifice effect in the annular orifice formed between the second lower disc valve 23 and the seat surface of the land 20d, linear characteristics in variation of the damping characteristics in the piston bounding in relation to the piston stroke speed can be obtained as shown in FIG. 8.

Figure 9:
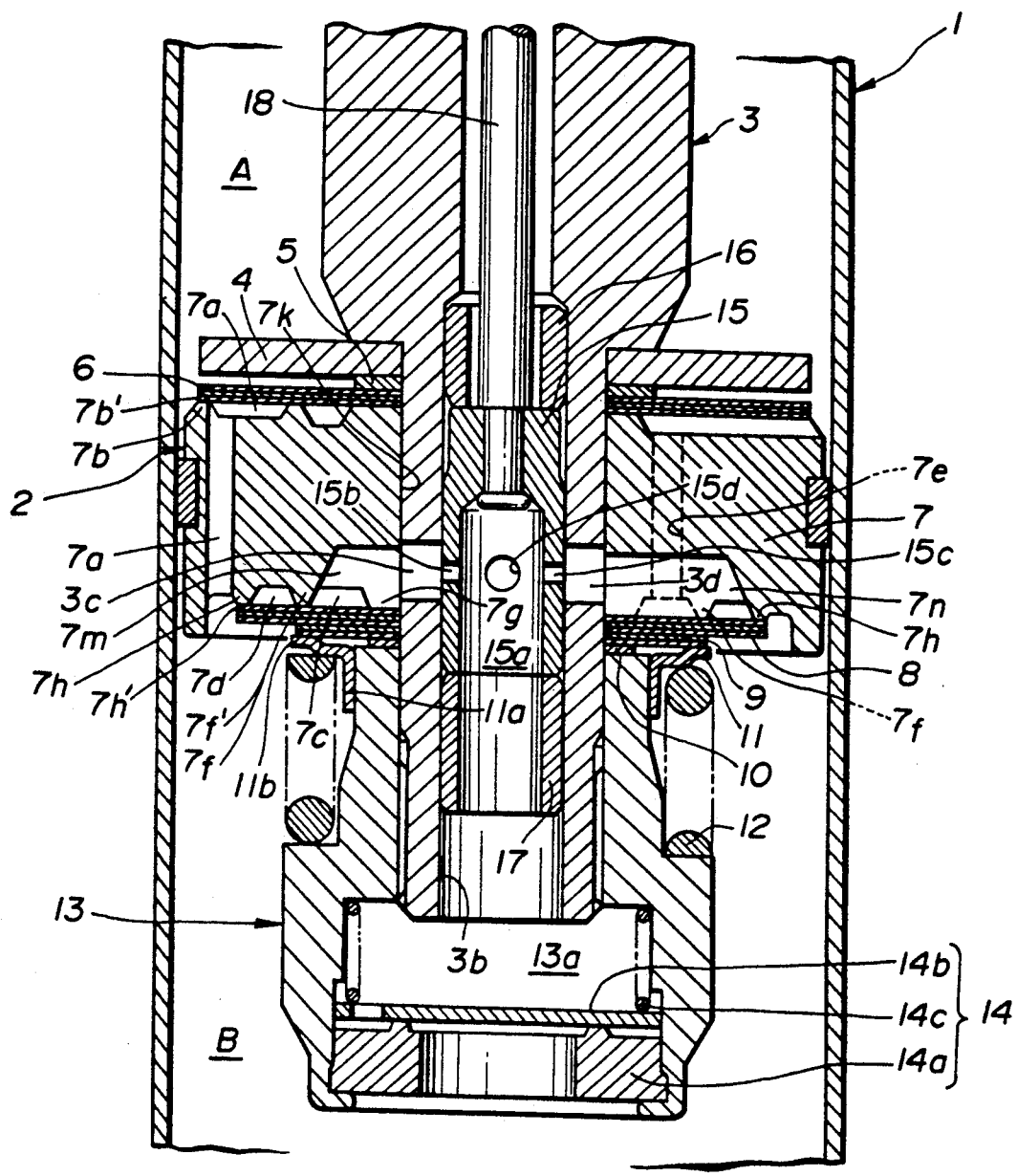
FIG. 9 is a sectional view of the major part of the second embodiment of a variable damping characteristics shock absorber according to the present invention.
Figure 10:
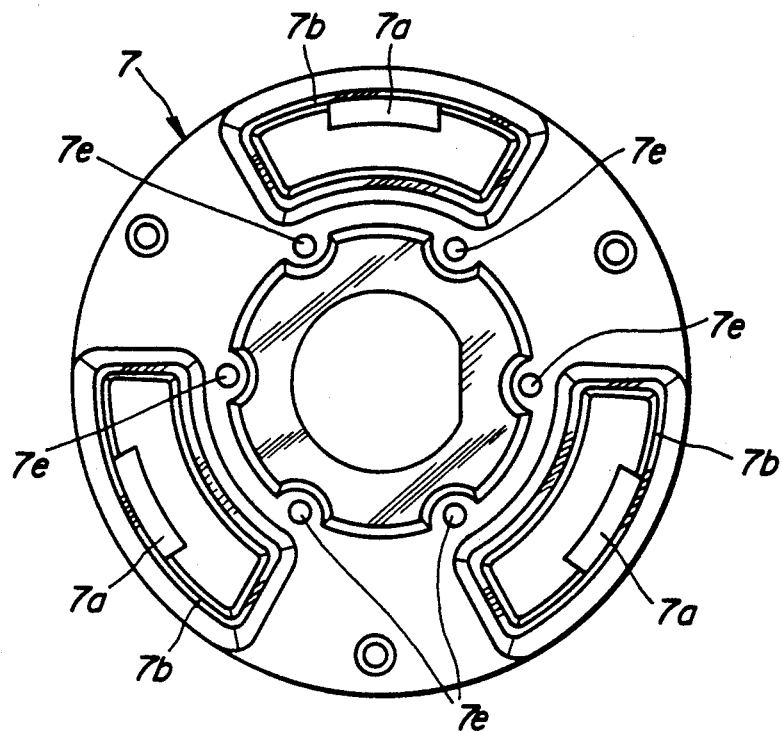
FIG. 10 is a plan view of a piston employed in the second embodiment of the shock absorber of FIG. 9.
Figure 11:
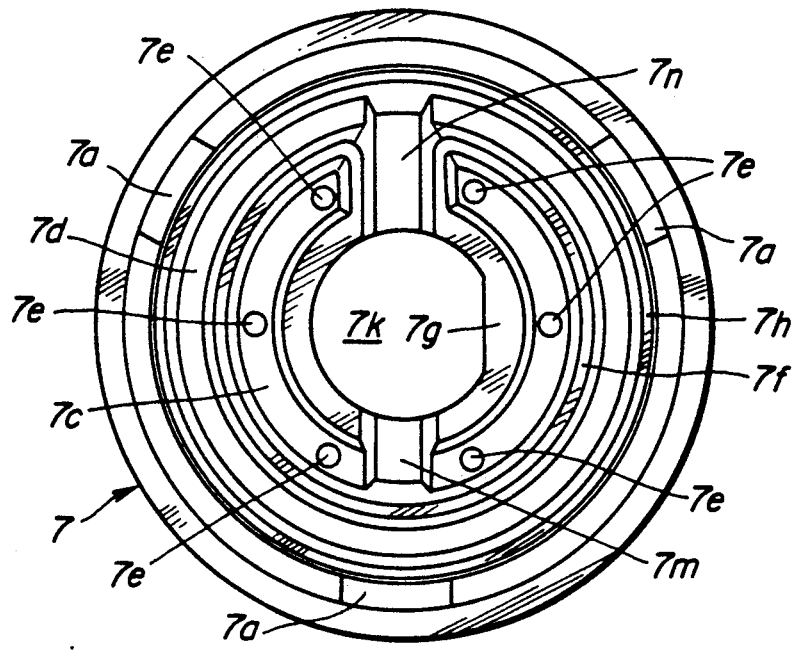
FIG. 11 is a bottom view of the piston employed in the second embodiment of the shock absorber of FIG. 9.

FIG. 9 shows the second embodiment of a variable damping force shock absorber according to the present invention. The shown embodiment is differentiated from the foregoing first embodiment in the construction for establishing fluid communication between the axial chamber C and the annular groove 7d. Also, in the shown embodiment, the upper port and the associated radially extending opening are omitted. Therefore, the components and constructions common to the foregoing first embodiment will be represented by the same reference numerals as the former embodiment and will not be discussed in detail in order to avoid redundant discussion for clarity of the disclosure.

In the shown embodiment, the oblique passage 7j in the former embodiment is replaced with radially extending grooves 7m and 7n. The radially extending grooves 7m and 7n are constructed and arranged for establishing fluid communication with the ports 3c and 3d formed through the piston rod 3. On the other hand, the radially extending orifice 7m is in fluid communication with the inner annular groove 7c, and the radially extending orifice 7n is in fluid communication with the outer annular groove 7d.

With the shown construction, the high pressure fluid in the upper fluid chamber A flows into the inner axial passage 7e via the clearance 7e' and subsequently into the inner annular groove 7c during a piston rebounding stroke. The working fluid in the annular groove 7c flows into the axial chamber C via the radially extending groove 7m and the port 3c. At this time, the fluid pressure in the axial chamber C is higher than that in the lower fluid chamber B. Therefore, the valve disc 14b is held at the position tightly seated on the valve seat 14a. Therefore, the working fluid in the axial chamber C flows into the radially extending groove 7n via the radially extending opening 15c or 15d and the port 3d. Therefore, the fluid pressure is introduced into the outer annular chamber 7d.

With the action set forth above, the fluid pressure is acted on both in the inner and outer grooves 7c and 7d for establishing a linear variation of the damping characteristics as that achieved by the former embodiment.

On the other hand, in the piston bounding stroke, the part of the working fluid flows through the outer axial passage 7a and the orifice defined between the upper disc valve 6 and the seat surface 7b' of the land 7b. Another part of the working fluid flows into the axial chamber C by shifting the disc valve 14b away from the valve seat 14a. The fluid in the axial chamber C flows into the radially extending groove 7m via the radially extending opening 15c or 15d and the port 3c and subsequently into the inner axial passage 7e via the inner annular groove 7c. Therefore, a linear variation of the damping characteristics can be obtained by the operation of the upper disc valve 6 and the bottom valve assembly 20 which is identical in construction to that in the former embodiment.

Figure 12:
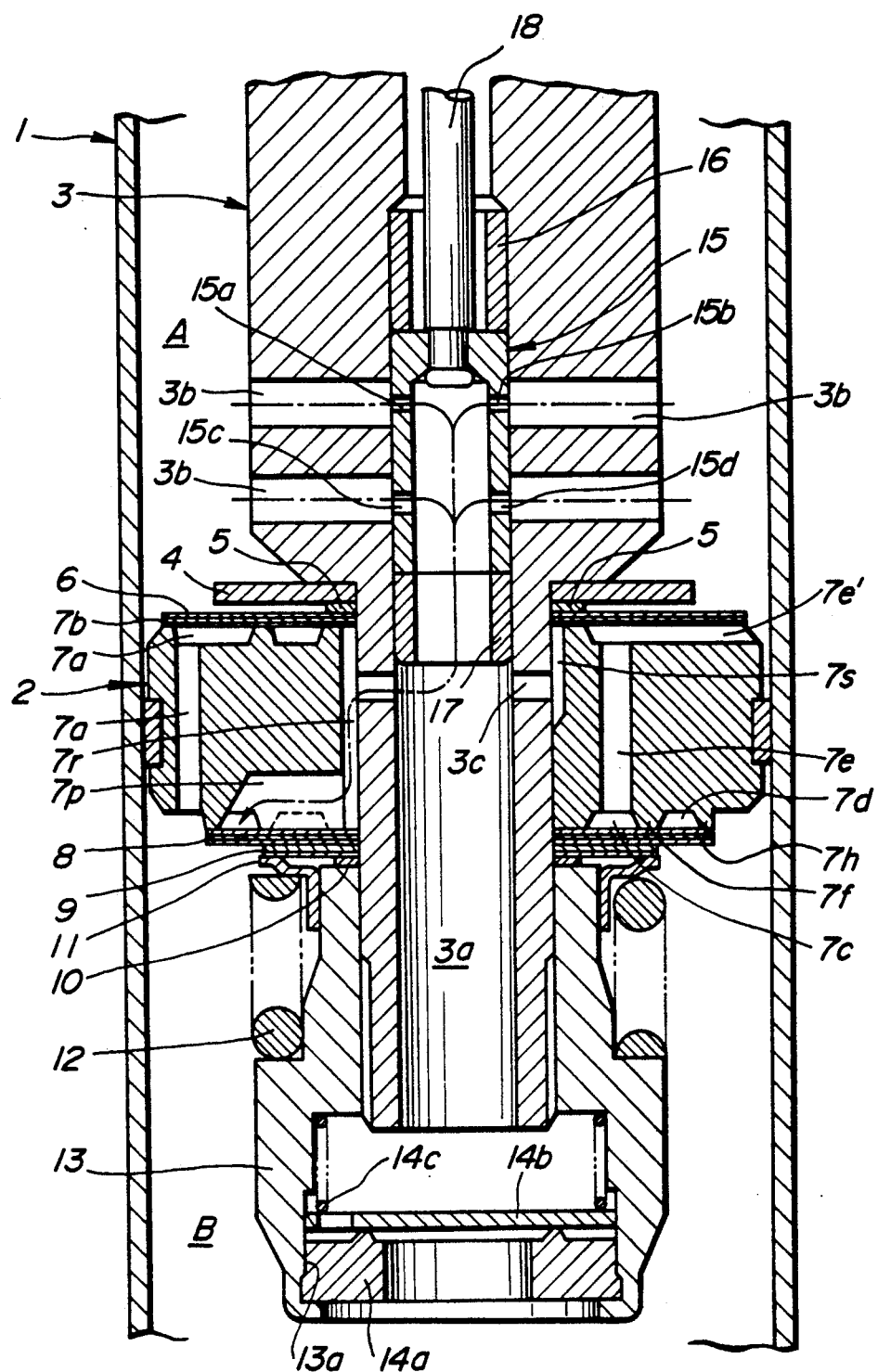
FIG. 12 is a sectional view of the major part of the third embodiment of a variable damping characteristics shock absorber according to the present invention.

FIG. 12 shows the third and perhaps the best mode embodiment of a variable damping force shock absorber according to the present invention. The shown embodiment has common components and constructions to the foregoing first embodiment. The common components will be represented by the same reference numerals to the first embodiment and will not be discussed in detail.

The shown embodiment is differentiated from the first and second embodiments in the construction for establishing fluid communication between the axial chamber C and the outer annular groove 7d. In the shown embodiment, the radially extending groove 7p is formed on the lower surface of the piston body 7. The radially extending groove 7p establishes fluid communication between the outer annular groove 7d and an axially extending groove 7r which is in fluid communication with an upper end of an opened annular groove 7s. The annular groove 7s is in fluid communication with the axial chamber C.

On the other hand, the piston rod 3 is formed of upper and lower radially extending ports 3b at axially offset positions to each other. Both of the upper and lower ports 3b are in fluid communication with the upper fluid chamber A. The ports 3b are, in turn, in fluid communication with the axial chamber via radially extending openings 15a, 15b and 15c, 15d, in which the opening 15a has a different diameter than the opening 15b and the opening 15c has different diameter than the opening 15d. In this respect, though as shown in FIG. 12, all of the openings 15a, 15b and 15c, 15d are aligned with the ports 3b, these openings may be aligned with or shifted away from the port 3b for varying flow restriction provided therefore.

In the shown construction, the working fluid flows into the outer annular groove 7d from the upper fluid chamber via the ports 3b and the radial openings 15a or 15b and 15c or 15d during a piston rebounding stroke. This fluid pressure thus introduced into the outer annular groove 7d cooperates with the fluid pressure introduced into the inner annular groove 7c via the inner axial passage 7e for providing linear variation characteristics of the damping characteristics as that provided in the first embodiment.

Since the fluid action during the piston bounding stroke is identical to that in the foregoing first embodiment, essentially the same linear variation characteristics can be obtained.

In addition, in the shown embodiment, since the fluid communication between the axial chamber and the upper fluid chamber is established with two axially offset radial openings, each opening can be smaller than that in the former embodiments. Consequently, the rotary valve member can be constructed smaller for reducing the required force for rotatingly driving and positioning the same at the desired angular position. Also, since the radially extending groove 7p of the shown embodiment is an axially elongated groove, fluid communication can be assured even when the piston body and the piston rod tolerate.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A variable damping force shock absorber, comprising:
    a hollow cylinder having cylindrical wall means defining a cylindrical bore containing a hydraulic damping fluid;
    a hollow piston rod;
    a piston fixedly mounted to said hollow piston rod and slidably disposed in said cylindrical bore to divide said cylindrical bore into a first chamber and a second chamber;
    said piston having a first axial end surface adjacent said first chamber and a second axial end surface adjacent said second chamber;
    said second axial end surface being formed with a first annular land, a radially outer groove surrounded by said first annular land, and a second annular land disposed radially inwardly of said first annular land and surrounded by said radially outer groove, and a radially inner groove surrounded by said second annular land;
    a damping valve having a valve disk seated on said first annular land and said second annular land to close fluid communication between said radially inner groove and said radially outer groove;
    said hollow piston rod being formed with a center axially extending opening, a first radially extending opening establishing fluid communication between said center axially extending opening and said first chamber, an annular peripheral groove axially spaced from said first radially extending opening, and a second radially extending opening disposed between said center axially extending opening and said annular peripheral groove to establish fluid communication therebetween;
    said piston being formed with an axial passage having one end opening to said radially inner groove and an opposite end communicating with said first chamber,
    said piston being formed with an obliquely extending opening having one end opening to said annular peripheral groove and an opposite end opening to said radially outer groove; and
    a rotary valve member rotatably disposed within said center axially extending opening and moveable to cover said first and second radially extending openings of said hollow piston rod, said rotary valve member being formed with a first group of valve openings mating with said first radially extending opening of said hollow piston rod and with a second group of valve openings mating with said second radially extending opening of said hollow piston rod, said rotary valve member having an axial chamber providing fluid communication between said first and second group of valve openings, said rotary valve member having a position wherein at least one of said first group of valve openings aligns with said first radially extending opening of said hollow piston rod and at least one of said second group of valve openings aligns with said second radially extending opening of said hollow piston rod to establish fluid communication between said first and second radially extending openings of said hollow piston rod.

2. A variable damping force shock absorber, comprising:
    a hollow cylinder having cylindrical wall means defining a cylindrical bore containing a hydraulic damping fluid;
    a hollow piston rod;
    a piston fixedly mounted to said hollow piston rod and slidably disposed in said cylindrical bore to divide said cylindrical bore into a first chamber and a second chamber;
    said piston having a first axial end surface adjacent said first chamber and a second axial end surface adjacent said second chamber;
    said second axial end surface being formed with a first annular land, a radially outer groove surrounded by said first annular land, a radially inner groove disposed radially inwardly of said radially outer groove, and a second land disposed radially inwardly of said first annular land and disposed between said radially outer and inner grooves;
    a damping valve having a valve disk seated on said first annular land and said second annular land to close fluid communication between said radially inner groove and said radially outer groove;
    said hollow piston rod being formed with a center axially extending opening, a first radially extending opening communicating with said center axially extending opening, and a second radially extending opening communicating with said center axially extending opening;
    said piston being formed with an axial passage having one end opening to said radially inner groove and an opposite end communicating with said first chamber,
    said piston being formed with a first radially extending groove having one end opening to said first radially extending opening of said hollow piston rod and an opposite end opening to said radially inner groove, and a second radially extending groove having one end opening to said second radially extending opening of said hollow piston rod and an opposite end opening to said radially outer groove; and a rotary valve member rotatably disposed within said center axially extending opening and moveable to cover said first and second radially extending openings of said hollow piston rod, said rotary valve member being formed with a first valve opening mating with said first radially extending opening of said hollow piston rod and with a second valve opening mating with said second radially extending opening of said hollow piston rod, said rotary valve member having an axial chamber providing fluid communication between said first and second valve openings, said rotary valve member having a position wherein said first valve opening aligns with said first radially extending opening of said hollow piston rod and said second valve opening aligns with said second radially extending opening of said hollow piston rod to establish fluid communication between said first and second radially extending openings of said hollow piston rod.

* * * * *